United States Patent
Danree et al.

(10) Patent No.: US 10,959,063 B2
(45) Date of Patent: Mar. 23, 2021

(54) NOTIFICATION METHOD FOR CONFIGURING A SECURE ELEMENT

(71) Applicant: IDEMIA FRANCE, Colombes (FR)

(72) Inventors: Arnaud Danree, Colombes (FR); Guillaume Larignon, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 15/038,403

(22) PCT Filed: Nov. 21, 2014

(86) PCT No.: PCT/FR2014/052989
§ 371 (c)(1),
(2) Date: May 20, 2016

(87) PCT Pub. No.: WO2015/075395
PCT Pub. Date: May 28, 2015

(65) Prior Publication Data
US 2016/0295344 A1    Oct. 6, 2016

(30) Foreign Application Priority Data

Nov. 21, 2013    (FR) ........................................ 1361481

(51) Int. Cl.
*H04W 4/14* (2009.01)
*H04W 12/04* (2021.01)
(Continued)

(52) U.S. Cl.
CPC ........... *H04W 4/14* (2013.01); *H04L 41/0803* (2013.01); *H04W 4/50* (2018.02); *H04W 4/60* (2018.02);
(Continued)

(58) Field of Classification Search
CPC ....... H04W 4/001; H04W 4/003; H04W 4/14; H04W 8/205; H04W 12/04; H04W 76/00;
(Continued)

(56) References Cited

U.S. PATENT DOCUMENTS 9,413,508 B2 *  8/2016  Mourad ................... H04N 5/38
2007/0274524 A1  11/2007  Ksontini et al.
(Continued)

FOREIGN PATENT DOCUMENTS

EP    1 530 392 A1    5/2005
EP    1530392 A1 *   5/2005  ............ H04W 12/12
(Continued)

OTHER PUBLICATIONS

3GPP TS 31.111 V11.3.0 (Sep. 2012); http://www.qtc.jp/3GPP/Specs/31111-b30.pdf.*
(Continued)

*Primary Examiner* — Hardikkumar D Patel
(74) *Attorney, Agent, or Firm* — MH2 Technology Law Group LLP

(57) ABSTRACT

Notification devices and methods for configuring a secure element incorporated into a terminal connected to a network are disclosed. The devices and methods may perform steps implemented by an application of the secure element, such as obtaining at least one item of information that can be used to configure the secure element stored in a memory of the terminal outside the secure element, sending the item of information and an identifier of the secure element to a configuration system, and obtaining configuration data originating from the configuration system, the configuration data being supplied to the secure element depending on the item of information.

26 Claims, 2 Drawing Sheets

(51) Int. Cl.
  *H04W 8/20* (2009.01)
  *H04W 4/50* (2018.01)
  *H04W 4/60* (2018.01)
  *H04W 12/00* (2021.01)
  *H04L 12/24* (2006.01)

(52) U.S. Cl.
  CPC ....... *H04W 8/205* (2013.01); *H04W 12/0023* (2019.01); *H04W 12/04* (2013.01)

(58) Field of Classification Search
  CPC ..... H04W 88/02; H04W 92/00; H04W 12/06; H04W 4/00; H04W 8/265; H04W 8/12; H04W 76/025; H04W 8/18; H04L 41/0803; H04B 1/38
  See application file for complete search history.

(56) References Cited

U.S. PATENT DOCUMENTS

| | | | |
|---|---|---|---|
| 2008/0261654 A1* | 10/2008 | Sakeen | H04W 88/02 455/558 |
| 2009/0153311 A1* | 6/2009 | Lee | B60R 25/2018 340/426.1 |
| 2010/0093396 A1 | 4/2010 | Roundtree | |
| 2011/0136482 A1 | 6/2011 | Kaliner | |
| 2012/0036282 A1 | 2/2012 | Chen et al. | |
| 2012/0106533 A1 | 5/2012 | Chen et al. | |
| 2012/0172016 A1 | 7/2012 | Veneroso et al. | |
| 2013/0165073 A1* | 6/2013 | Madsen | H04W 8/18 455/411 |
| 2014/0051398 A1* | 2/2014 | Ben Shlush | H04W 8/12 455/411 |

FOREIGN PATENT DOCUMENTS

| | | | |
|---|---|---|---|
| EP | 1530392 A1 * | 5/2005 | ........ H04W 12/1206 |
| FR | 2 864 413 A1 | 6/2005 | |
| JP | 2011-525311 A | 9/2011 | |
| KR | 20060117319 A | 11/2006 | |
| WO | 2005/109947 A1 | 11/2005 | |
| WO | 2013/036011 A2 | 3/2013 | |

OTHER PUBLICATIONS

Jaemin Park et al.; Secure Profile Provisioning Architecture for Embedded UICC; IEEE 2013 International conference on Availability, Reliability and Security; Sep. 2, 2013; 7 pgs., pp. 297-303.
EX. Lena Kufer; International Search Report dated Mar. 6, 2015 from corresponding International Application No. PCT/FR2014/052989; 3 pgs.
Japanese Office Action dated Oct. 23, 2019 in JP Application No. 2016-533192, 19 pages.
Japanese Office Action issued in corresponding Japanese Patent Application No. 2016-533192 dated Sep. 3, 2019, pp. 1-15 (with English translation).
KIPO Notification of Reason for Refusal dated Mar. 29, 2020, Korean Patent Application No. 10-2016-7015326, pp. 1-5.

* cited by examiner

NOTIFICATION METHOD FOR CONFIGURING A SECURE ELEMENT

CROSS-REFERENCE TO RELATED APPLICATIONS

This application is a U.S. National Stage application of International Application No. PCT/FR2014/052989 filed 21 Nov. 2014, which claims priority to French Application No. 1361481 filed 21 Nov. 2103, the entire disclosures of which are hereby incorporated by reference in their entireties.

BACKGROUND OF THE INVENTION

The present invention relates to the field of configuration of a secure element incorporated into a terminal.

In particular and in a non-limiting manner, the invention applies to secure elements of "UICC" ("Universal Integrated Circuit Card") and "eUICC" ("embedded Universal Integrated Circuit Card") type.

For more information on "UICC" and "eUICC" secure elements, those skilled in the art will refer to the "ETSI 102.221" standard and to the "ETSI TS 103 383" specifications respectively.

In this document, the concept of "personalization profile" must be interpreted in the wider sense, namely as a set of at least one file and/or data item. A personalization profile in the sense of the invention can in particular comprise at least one element out of:

- a standard file as defined by the 3GPP or ETSI specifications for UICC and their applications and particularly by the 3GPP 31.102 and ETSI 102.221 standards;
- a proprietary file;
- a configuration file of an operating system;
- a Java Card application and associated personalization elements;
- data such as transport protocol keys, authentication algorithm parameters, etc.

The personalization profile is used by a task application to communicate with entities outside the terminal.

In a known manner, when an operator wishes to install a new personalization profile in a secure element, this operator uses a configuration module of a remote server. This configuration module is able to send data to the secure element according to a secure transport protocol, the exchanges being made secure by means of a key shared by these two entities. The operator also sends data including an installation script of the profile, which is then executed in order to install the profile in the secure element.

However, the loaded profile, chosen by the operator, is not always the profile that will allow optimal use of the terminal.

One of the purposes of the invention is to solve such a problem.

More generally, the invention is aimed at mechanisms for facilitating the configuration of an incorporated secure element of a terminal.

SUBJECT AND SUMMARY OF THE INVENTION

For this purpose, the present invention concerns a notification method for configuring a secure element incorporated into a terminal connected to a network, the method comprising the following steps implemented by an application of the secure element:

obtaining at least one item of information that can be used to configure the secure element stored in a memory of the terminal outside the secure element, sending the item of information and an identifier of the secure element to a configuration system, and obtaining configuration data originating from the configuration system, the configuration data being provided to the secure element depending on the item of information.

The invention is advantageous in that the configuration data are provided depending on the item of information that can be used to configure the secure element. Thus, the sending of the item of information makes it possible to choose the most appropriate configuration data for the secure element incorporated into the terminal. Furthermore, the sending of the item of information makes it possible to choose the most appropriate conditions for sending configuration data. These conditions are for example the time of sending the configuration data, and/or the network used for this sending.

In a particular embodiment, the application is executed by an operating system of the secure element.

In a particular embodiment, the steps of obtaining the item of information, and sending the item of information and an identifier of the secure element are implemented when the secure element is powered up and/or periodically.

The implementation of these steps when the secure element is powered up makes it possible to configure the terminal as soon as it connects to a network for the first time.

The periodic implementation of these steps makes it possible to update the configuration data in the event of a change of use of the terminal and/or in the event of a change in the network used by the terminal.

In a particular embodiment, the sending of the item of information and the identifier of the secure element is done using the Sim Tool Kit command "SEND SMS" or "OPEN CHANNEL", defined by the "3GPP 31.111" standard. The "OPEN CHANNEL" command is a proactive command allowing the secure element and the terminal to communicate.

In general, the secure element can obtain the item of information by any means, either directly by the module of the terminal including the item of information, or by a module that is responsible for obtaining then sending the item of information, this item of information being contained in another module of the terminal. In particular, the secure element can obtain the item of information from a communication interface of the terminal with the network, or from an application executed by a processor of the terminal, this application being outside the secure element. The communication interface of the terminal with the network is for example a radio module or a module for accessing an internet or telephone network.

In a particular embodiment, the obtaining of the item of information is done at the request of the application of the secure element. This request can be sent to the communication interface or to the application executed by the processor of the terminal. This request can be in accordance with the Sim Tool Kit command "PROVIDE LOCAL INFORMATION" defined by the "3GPP 31.111" standard.

In a particular embodiment, the terminal carries out the following steps:

sending of a request for the reading of the item of information by the communication interface to the application executed by the processor of the terminal, and sending of the item of information by the application executed by the processor of the terminal to the communication interface, or sending of a request for the reading of the item of information by the application executed by the processor of the terminal to the communication interface, and sending of the item of information by the communication interface to the application executed by the processor of the terminal.

In a particular embodiment, the various steps of the notification method are determined by computer programming instructions.

As a consequence the invention also pertains to a computer program on an information medium (or storage medium), this first program being able to be implemented in a secure element or more generally in a computer, and optionally a second computer program on an information medium able to be implemented in a terminal or more generally in a computer, these programs including instructions suitable for the implementation of the steps of a notification method as defined above.

These programs can use any programming language, and be in the form of source code, object code, or intermediate code between source code and object code, such as in a partly compiled form, or in any other form desired.

The invention also pertains to a first information medium (or storage medium) readable by a secure element or more generally by a computer, and including instructions of a first computer program as mentioned above.

The invention also pertains to a second information medium (or storage medium) readable by a terminal or more generally by a computer, and including instructions of a second computer program as mentioned above.

The information media can be any entity or device capable of storing programs. For example, the media can include a storage means, such as a rewritable non-volatile memory (of "EEPROM" or "Flash NAND" type for example), or such as a "ROM", for example a "CD ROM" or a microelectronic circuit "ROM", or else a magnetic storage means, for example a "floppy disk" or a hard disk.

Moreover, the information media can be transmissible media such as electrical or optical signals, which can be conveyed via electrical or optical cables, by radio or by other means. The programs according to the invention can in particular be downloaded from an Internet-type network.

Alternatively, the information media can be integrated circuits wherein the programs are incorporated, the circuits being suitable for executing or for being used in the execution of the method in question.

The invention further concerns a secure element intended to be incorporated into a terminal connected to a network, said secure element comprising an application including:

means for obtaining at least one item of information that can be used for the configuration of the secure element stored in a memory of the terminal outside the secure element, means for sending said item of information and an identifier of the secure element to a configuration system, and means for obtaining configuration data originating from the configuration system, said configuration data being provided to the secure element depending on said item of information.

In a particular embodiment, the secure element is compliant with the "ISO 7816" standard and capable of processing commands of "APDU" type.

In a particular embodiment, the secure element is of "UICC" type or of "eUICC" type.

In a particular embodiment, the application of the secure element is executed by an operating system of the secure element.

The invention further concerns a terminal including a secure element as defined above.

The invention further concerns a method for configuring a secure element incorporated into a terminal connected to a network, the method being implemented by a configuration system, the method comprising:

the obtaining and memorizing of at least one item of information that can be used to configure the secure element and an identifier of the secure element originating from the secure element, the establishment of a secure communication channel with the secure element, and the sending of configuration data to the secure element via the communication channel, the configuration data being provided to the secure element depending on said item of information.

In a particular embodiment, the configuration data are personalization data.

In a particular embodiment, the sending of the configuration data is carried out according to a protocol including a step of encryption and/or signature.

In a particular embodiment, the protocol is one of:

"Secure Channel Protocol 80",

"Secure Channel Protocol 81",

"Secure Channel Protocol 02", and

"Secure Channel Protocol 03", defined by the "Global Platform 2.2" standard.

In a particular embodiment, the item of information is one of:

the "IMEI" number of the terminal, the "IMEISV" number of the terminal, the country where the terminal is, said network, the power of said network, the type of communication channel supported by the terminal, and the type of carrier used by the terminal.

In a particular embodiment, the identifier of the secure element is one of:

the "eUICC ID" defined by version 1.46 of the specification "Remote Provisioning Architecture for Embedded UICC" of the "Global System for Mobile Communications Association", the "ICC ID" defined by the "ISO 7812" standard, and the "IMSI".

In a particular embodiment, the conditions for sending the configuration data are chosen depending on the item of information.

In a particular embodiment, the item of information is used to determine at least one of the elements out of:

the network used to send the configuration data, the communication channel used to send the configuration data, the carrier used to send the configuration data.

More generally, the item of information can for example be used to determine at least one of the elements out of:

a personalization profile adapted to the terminal type, a personalization profile adapted to the country where the terminal is located, the time of sending of the configuration data, the network used to send the configuration data, the communication channel used to send the configuration data, the carrier used to send the configuration data.

The determination of a personalization profile adapted to the terminal type can be done when the item of information is the "IMEI" or "IMEISV" number of the terminal. The determination of a personalization profile adapted to the country where the terminal is located can be done when the item of information is the "MCC" code of the terminal. The configuration data are then personalization data including a profile installation script.

In addition, the determination of the time of sending of the configuration data can be done when the item of information is the "NMR" code. The configuration module then sends the configuration data when the coverage of the network is of good quality. Furthermore, the determination of the network used to send the configuration data can be done when the item of information is the "MNC" code. In addition, the determination of the communication channel used to send the configuration data can be done when the item of information indicates the different types of communication channels supported by the terminal and the determination of the carrier can be done when the item of information indicates the type of carrier that can be used by the terminal.

In a particular embodiment, the method comprises the determination (by the configuration system), on the basis of said at least one item of information, of the communication channel with the highest speed supported by the secure element (or by the terminal), said communication channel with the highest speed being used as a secure communication channel in the step of sending the configuration data to the secure element.

In a particular embodiment, the method comprises a step of verification (by the configuration system) to verify whether or not a communication channel with a speed at least equal to a predetermined threshold value can be established with the secure element (or more generally with the terminal) or to verify whether or not a communication channel of a predetermined type can be established with the secure element (or more generally with the terminal), and:

if so, the sending of first data as configuration data in the step of sending to the secure element;

if not, the sending of second data as configuration data in the step of sending to the secure element, wherein the first data are of a larger size (in terms of memory space) than the second data.

The first data and the second data are for example personalization profiles.

The configuration system can thus adapt the configuration data that it sends to the secure element depending on the type of communication channel (or of the communication protocol) supported by the secure element (or more generally by the terminal into which said secure element is incorporated).

In a particular example, the predetermined type is the "https" type. In other words, in the verification step, the configuration system verifies whether or not a communication channel of https type (or according to the https protocol) can be established with the secure element (or more generally with the terminal). In this case, the first data are for example adapted to be sent according to the https protocol. Moreover, the second data are for example adapted to be transmitted to the secure element according to the SMS protocol.

It is thus possible to optimize the transmission of the configuration data to the secure element.

The first data are for example 2, 5, 10, or even 20 times more bulky in terms of data size than the second data. In other words, the first data have a data size N times larger than the second data, N being equal to one of the values 2, 5, 10, and 20.

In a particular embodiment, the configuration system determines, on the basis of said at least one item of information, the type of the terminal into which the secure element is incorporated. The terminal can for example be a mobile phone (or more generally a mobile telecommunications terminal) or an electricity meter, as explained in more detail in the remainder of this document. Depending on the type of the terminal thus determined, the configuration system can determine at least one of the parameters below:

(a) the configuration data to be sent to the secure element in said sending step (by selecting, for example, the first data or the second data mentioned above);

(b) the communication channel, the communication protocol and/or the carrier to be used in said step of sending the configuration data to the secure element.

In a particular embodiment, the different steps of the configuration method are determined by computer program instructions.

Consequently, the invention also pertains to a computer program on an information medium (or storage medium), this program being able to be implemented by a configuration system or more generally by a computer, this program including instructions suitable for the implementation of the steps of a method of configuration as defined above.

This program can use any programming language, and be in the form of source code, object code, or intermediate code between source code and object code, such as in a partly compiled form, or in any other form desired.

The invention also pertains to an information medium (or storage medium) readable by a secure element or more generally by a computer, and including instructions of a first computer program as mentioned above.

The information medium can be any entity or device capable of storing the program. For example, the media can include a storage means, such as a rewritable non-volatile memory of "EEPROM" or "Flash NAND" type for example), or such as a "ROM", for example a "CD ROM" or a microelectronic circuit "ROM", or else a magnetic storage means, for example a "floppy disk" or a hard disk.

Moreover, the information medium can be a transmissible medium such an electrical or optical signal, which can be conveyed via an electrical or optical cable, by radio or by other means. The program according to the invention can in particular be downloaded from an Internet-type network.

Alternatively, the information medium can be an integrated circuit wherein the program is incorporated, the circuit being suitable for executing or for being used in the execution of the method in question.

The invention further concerns a system of configuration of a secure element incorporated into a terminal connected to a network, the configuration system comprising:

a management module able to obtain at least one item of information that can be used to configure the secure element and an identifier of the secure element originating from the secure element, a module for secure communication with the secure element, the secure communication module being able to establish a secure communication channel with the secure element, a first memory able to memorize the item of information and the identifier of the secure element, and a configuration module able to send configuration data to the secure element via the communication channel, the configuration data being provided to the secure element depending on the item of information.

In a particular embodiment, the secure communication module comprises decryption means.

In a particular embodiment, the configuration module comprises:
means for sending the identifier of the secure element to the first memory, and
means for retrieving the item of information, in response to the sending.

In a particular embodiment, the configuration module comprises:
means for sending the item of information to a second memory, and
means for retrieving the configuration data, in response to the sending.

In addition, the invention concerns a system comprising a terminal including a secure element as defined above, this terminal and this secure element being able to implement a notification method as defined above, this configuration system being able to implement a configuration method as defined above.

BRIEF DESCRIPTION OF THE DRAWINGS

Other features and advantages of the present invention will become apparent from the description given below, with reference to the appended drawings which illustrate an exemplary embodiment thereof, without being in any way limiting in nature. In the figures.

DETAILED DESCRIPTION OF SEVERAL EMBODIMENTS

The present invention relates to the field of the configuration of a secure element incorporated into a terminal and more particularly concerns the configuration of such a secure element by a configuration system based on items of information transmitted by the secure element to this configuration system.

Figure 1:
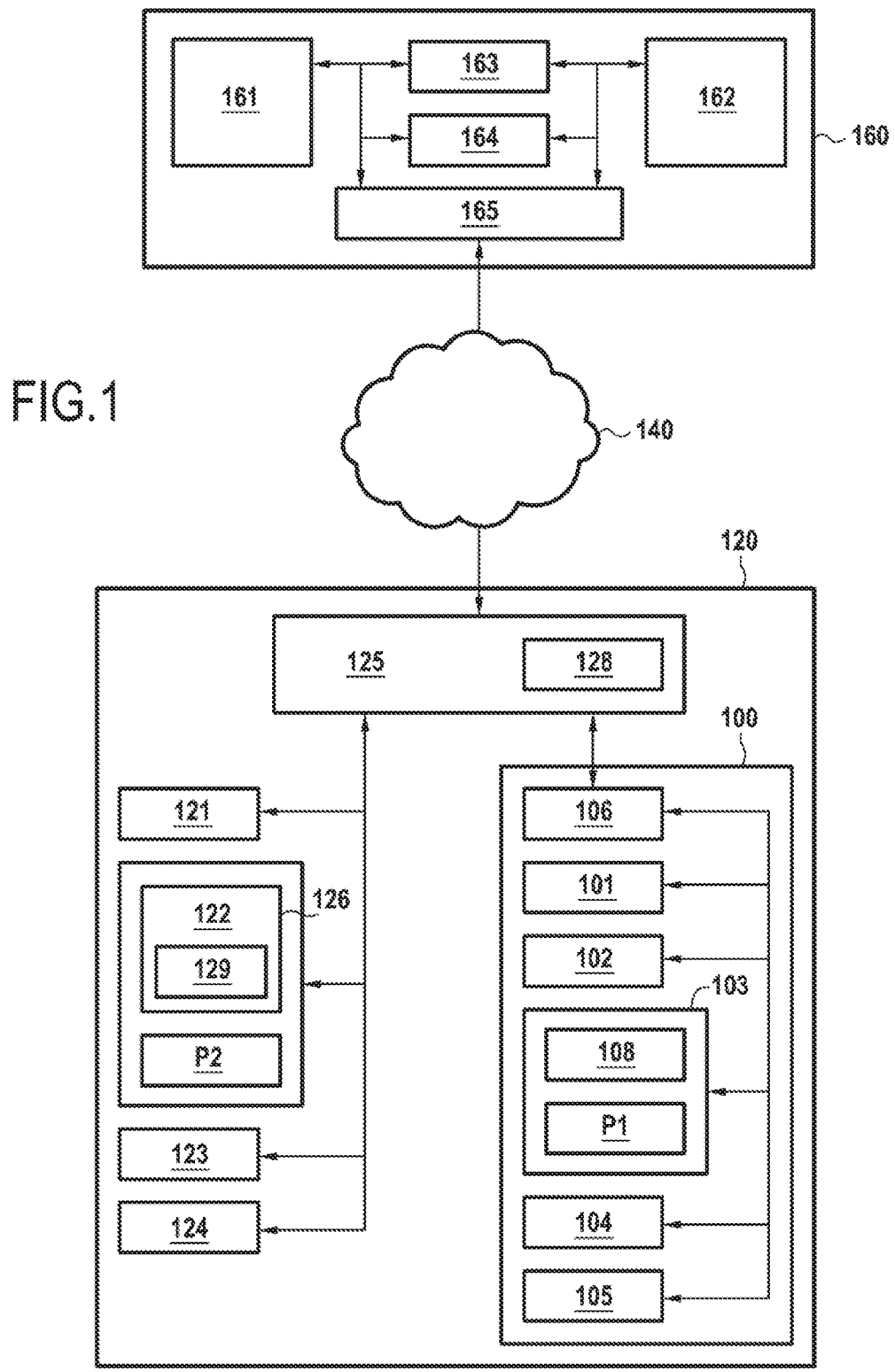
FIG. 1 schematically represents the hardware architectures of a terminal, a secure element and a configuration system in accordance with an embodiment of the invention.

FIG. 1 schematically represents, according to a first embodiment, a secure element 100 incorporated into a terminal 120 configured to be able to cooperate, via a network 140, with a configuration system 160.

In an example, the secure element 100 is compliant with the "ISO 7816" standard and able to process commands of "APDU" ("Application Protocol Data Unit") type. This secure element 100 can also be of "UICC" ("Universal Integrated Circuit Card") type. In a variant, the secure element can be of "eUICC" ("embedded Universal Integrated Circuit Card") type. Furthermore, the terminal 120 can for example be a mobile phone, a motor vehicle, a washing machine, a street lamp, or an electricity meter. In addition, the network 140 can for example be an Internet network or a telephone network.

The secure element 100 has the conventional architecture of a computer. This secure element 100 particularly includes a processor 101, an operating system 102, a read-only memory 103 (of "ROM" type), a rewritable non-volatile memory 104 (of "EEPROM" or "Flash NAND" type for example), a rewritable volatile memory 105 ("RAM" type), and a communication interface 106.

In this example, the read-only memory 103 constitutes an information (or storage) medium in accordance with a particular embodiment of the invention. In the read-only memory 103 a first computer program P1 is stored which allows the secure element to implement a first part of the notification method in accordance with a particular embodiment of the invention (cf. FIG. 2). In a variant, the first computer program P1 is stored in the rewritable non-volatile memory 104.

Furthermore, the read-only memory 103 stores an application 108 implemented by the operating system 102. In a variant, the application 108 is stored in the rewritable non-volatile memory 104. In a variant, the application 108 is stored in the operating system 102.

The terminal 120 also has the conventional architecture of a computer. Said terminal 120 particularly includes a processor 121, a read-only memory 122 (of "ROM" type), a rewritable non-volatile memory 123 (of "EEPROM" or "Flash NAND" type for example), a rewritable volatile memory 124 (of "RAM" type), and an interface 125 for communication with the network 140 and with the communication interface 106 of the secure element 100.

In this example, the read-only memory 122 constitutes an information (or storage) medium in accordance with a particular embodiment of the invention. In the read-only memory 122 a second computer program P2 is stored which allows the terminal 120 to implement a second part of the notification method in accordance with a particular embodiment of the invention (cf. FIG. 2). In a variant, the second computer program P2 is stored in the rewritable non-volatile memory 123.

In addition, the read-only memory 122 stores an application 126 executed by the processor 121. In a variant, the application 126 is stored in the rewritable non-volatile memory 123.

In an example, a memory of the communication interface 125 stores a first item of information 128 that can be used to configure the secure element 100. In addition, in this example, the application 126 stores a second item of information 129 that can be used to configure the secure element 100.

The configuration system 160 includes a management module 161, a configuration module 162, a first memory 163, a second memory 164, and a module 165 for secure communication with the secure element 100. In addition, the configuration system 160 stores a program P3. In an example, the configuration system 160 is included in a remote server having the conventional architecture of a computer. In another example, the modules 161, 162, 165 and memories 163, 164 of the configuration system are distributed in several remote servers, each of these servers having the conventional architecture of a computer. In this case, the remote servers communicate with one another by means of an optionally secure communication network.

Figure 2:
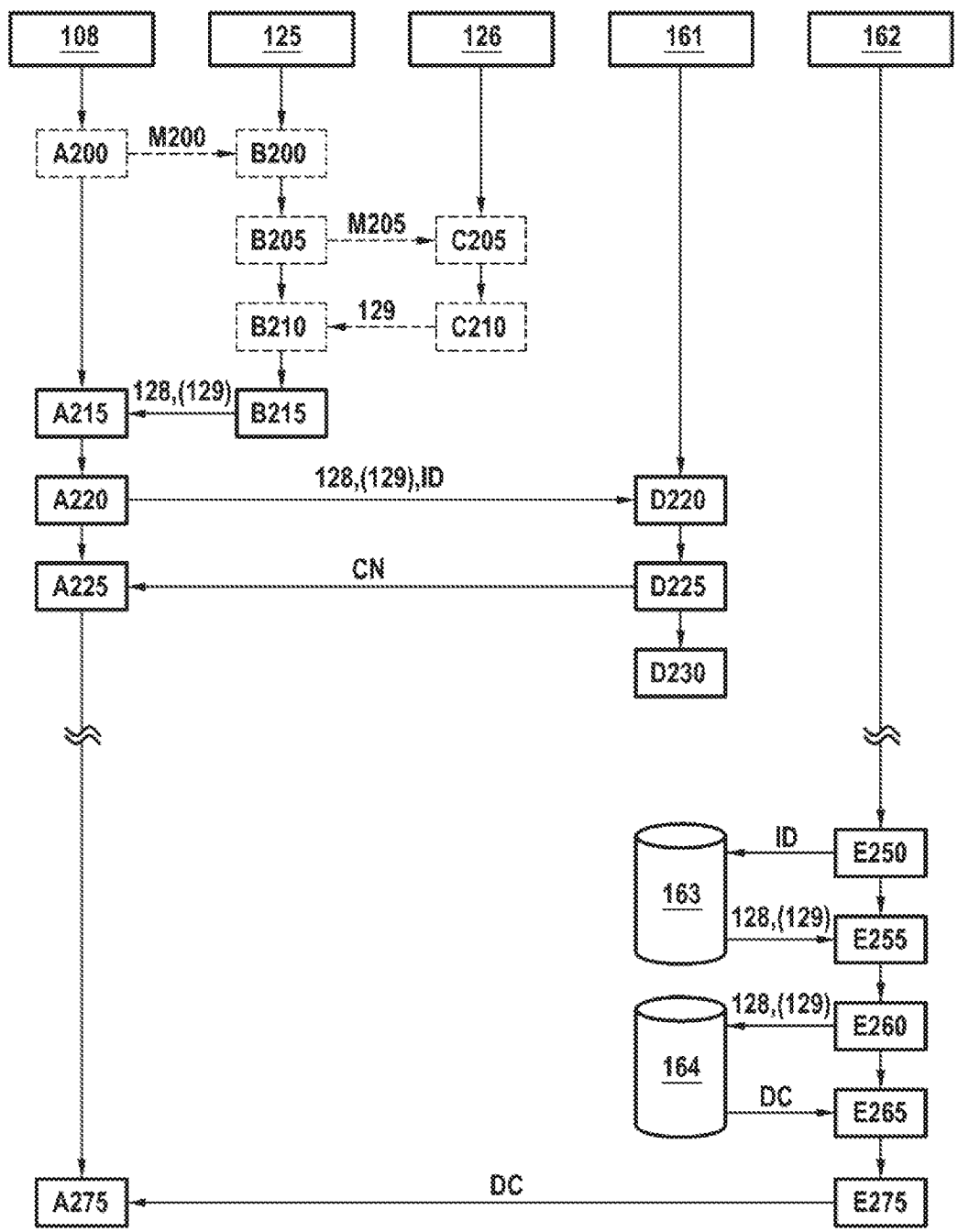
FIG. 2 specifically represents in the form of a block diagram the main steps of a notification method and a configuration method in accordance with an embodiment of the invention.

FIG. 2 represents, still according to the first embodiment, a notification method for configuring the secure element 100. The steps A200, A215, A220, A275 of this notification method are implemented by the application 108 of the secure element 100 executing the program P1 and the steps B200, B205, C205, B210, C210 and B215 of this notification method are implemented by the terminal 120 executing the program P2.

In a step A200, the application 108 sends a request M200 for the reading of the first item of information 128 that can be used to configure the secure element 100 to a communication interface 125 of the terminal 120. On receiving this request M200, the communication interface 125 sends (B215) the first item of information 128 to the application 108.

In a variant, the application 108 sends a request M200 for the reading of the second item of information 129 that can be used to configure the secure element 100. In this variant, the communication interface 125 of the terminal 120 then sends, in a step B205, a request M205 for the reading of the second item of information 129 to the application 126 of the terminal 120. On receiving such a request, the application 126 sends (C210) the second item of information 129 to the communication interface 125. Next, the communication interface 125 sends (B215) the second item of information 129 to the application 108.

In a variant, the application 108 sends a request M200 for the reading of the first item of information 128 and of the second item of information 129. In this variant, the communication interface 125 of the terminal 120 then sends, in a step B205, a request M205 for the reading of the second item of information 129 to the application 126 of the terminal 120. On receiving such a request, the application 126 sends (C210) the second item of information 129 to the communication interface 125. Next, the communication interface 125 sends (B215) the first item of information 128 and the second item of information 129 to the application 108.

In a second embodiment, the communication interface 106 of the secure element 100 does not communicate with the communication interface 125 and communicates with the application 126. This second embodiment is a variant of the first embodiment described above and differs only in that the terminal 120 has another logic or hardware configuration, this having the consequence that the application 108 of the secure element 100 communicates with the application 126 instead of communicating with the communication interface 125. Thus, in this embodiment, the application 108 sends (A200) a request M200 for the reading of the second item of information 129 to the application 126. On receiving this request M200, the application 126 sends (B215) the second item of information 129 to the application 108. In a variant, the application 108 sends a request M200 for the reading of the first item of information 128 to the application 126. In this variant, the application 126 then sends, in a step B205, a request M205 for the reading of the first item of information 128 to the communication interface 125 of the terminal 120. On receiving such a request, the communication interface 125 sends (C210) to the application 126 the first item of information 128. Next, the application 126 sends (B215) the first item of information 128 to the application 108. In a variant, the application 108 sends a request M200 for the reading of the first item of information 128 and the second item of information 129 to the application 126. In this variant, the application 126 then sends, in a step B205, a request M205 for the reading of the first item of information 128 to the communication interface 125 of the terminal 120. On receiving such a request, the communication interface 125 sends (C210) the first item of information 128 to the application 126. Next, the application 126 sends (B215) the first item of information 128 and the second item of information 129 to the application 108.

In both embodiments, the sending of requests and data between the communication interface 125 and the application 126 of the terminal 100 are for example done using the "AT" commands defined by the "3GPP TS 27.007 standard".

In addition, the request M200 sent by the application 108 can be in accordance with the "Sim Tool Kit PROVIDE LOCAL INFORMATION" command defined by the "3GPP 31.111" standard.

The application 108 sends the request M200 when the secure element 100 is powered up. In a variant the application 108 sends the request M200 periodically. In another variant, the application 108 sends the request M200 when the secure element 100 is powered up and periodically.

In a variant, the step A200 is not done and the communication interface 125 (or the application 126) sends (B215) the item of information 128 and/or 129 to the application 108, when the secure element 100 is powered up and/or periodically, using an "APDU" command defined by the "ISO 7816" standard, or else using a "TERMINAL PROFILE" command defined by the "3GPP TS 31.111" standard.

When the item of information 128 and/or 129 is obtained (A215) following a request M200 sent using the "Sim Tool Kit PROVIDE LOCAL INFORMATION" command defined by the "3GPP 31.111" standard, this item of information 128 and/or 129 is the "IMEI" ("International Mobile Equipment Identity") number, or the "IMEISV" ("International Mobile Equipment Identity Software Version") number, or the "MCC" ("Mobile Country Code") code, or the "MNC" ("Mobile Network Code") code, or the "NMR" ("Network Measurement Report") code. In a variant, this item of information 128 and/or 129 is a combination of the numbers and codes mentioned above. The "IMEI" and "IMEISV" numbers, as well as the "MCC", "MNC" and "NMR" are for example defined by the "3GPP TS 31.111" specification. The "IMEI" and "IMEISV" numbers are identifiers of the terminal 120. The "IMEI" and "IMEISV" numbers include a "TAC" ("Type Allocation Code") number defining the country where the terminal 120 has been registered, a "SNR" ("Serial Numero") corresponding to the series number, and a checksum. The "MCC" code corresponds to the country where the terminal 120 is. The "MNC" code defines the network 140. Furthermore, the "NMR" code indicates the power of the network 140.

In a particular embodiment, the item of information 128 and/or 129 indicates (in byte 17 of a "TERMINAL PROFILE" command for example) the various types of communication channels supported by the terminal 120, for example for the "BIP" ("Beaver Independent Protocol") protocol when the item of information 128 and/or 129 is obtained (A215) using a "TERMINAL PROFILE" command defined by the "3GPP TS 31.111" standard.

In a particular embodiment, the item of information 128 and/or 129 indicates (byte 13 of a "TERMINAL PROFILE" command for example) the type of carrier that can be used by the terminal 120. This carrier is, for example, of "CSD" ("Circuit Switched Data"), "GPRS" ("General Packet Radio Service"), "Bluetooth", "IrDA" ("Infrared Data Association"), or "RS 232" type.

Next, in a step A220, the application 108 of the secure element 100 sends the item of information 128 and/or 129 and an identifier ID of the secure element 100 to the management module 161 of the configuration system 160. In an example, this sending is done using the Sim Tool Kit "SEND SMS" or "OPEN CHANNEL" command, defined by the, "3GPP 31.111" standard. The "OPEN CHANNEL" command is a proactive command allowing the secure element and the terminal to communicate.

In an example, the identifier ID of the secure element 100 is the "eUICC ID" defined by version 1.46 of the specification "Remote Provisioning Architecture for Embedded UICC" of the "Global System for Mobile Communications Association", the "ICC ID" defined by the "ISO 7812" standard, or the "IMSI" ("Internal Mobile Subscriber Identity").

If the Sim Tool Kit command "SEND SMS" is used, it is not necessary to send the identifier ID of the secure element 100, because the header of the message sent by this command includes the "IMSI". Specifically, the network 140 knows the "IMSI" of the terminal 120 when this terminal 120 is connected to said network 140.

In addition, as described in more detail below, the application 108 of the secure element 100 obtains, in a step A275, via a secure communication channel, configuration data DC originating from the configuration module 162 of the configuration system 160, these configuration data DC being provided to the secure element 100 depending on the item of information 128 and/or 129.

FIG. 2 represents, according to an embodiment, a method of configuration of the secure element 100, implemented by the configuration system 160 executing the program P3.

This method includes a step D220 of obtaining, by the management module 161, of the item of information 128 and/or 129 and the identifier ID of the secure element 100 sent by the application 108 of the secure element 100. This method further includes a step D225 of establishing a secure communication channel CN with the secure element 100.

Next, in a step D230, the management module 161 memorizes the item of information 128 and/or 129 and the identifier ID of the secure element 100 in the first memory 163.

At the time of configuring the secure element 100, a personalization module 162 sends, in a step E250, the identifier ID of the secure element 100 to the first memory 163.

The step E250 is for example performed after the first memorization (D230) of the item of information 128 and/or 129 and the identifier ID of the secure element 100 by the management module 161 in the first memory 163. In another example, the step E250 is performed periodically. In another example, the step E250 is performed after the first memorization (D230) and periodically.

In response to this sending of step E250, the item of information 128 and/or 129 is retrieved (E255) by the personalization module 162. Next, the personalization module 162 sends, in a step E260, the item of information 128 and/or 129 to the second memory 164. In response to this sending, configuration data DC of the secure element 100 are retrieved (E265) by the personalization module 162.

The step E265 is followed by a step E275 of sending configuration data DC by the configuration module 162 to the application 108 of the secure element 100 via the communication channel CN.

The sending step E175 can be done according to a protocol including an encryption step and/or a signature step. In an example, the protocol is the "Secure Channel Protocol 80", the "Secure Channel Protocol 81", the "Secure Channel Protocol 02", or the "Secure Channel Protocol 03". These protocols are defined by the "Global Platform 2.2" standard.

Furthermore, as described in more detail below, the configuration module 132 can, in an example, take into account the item of information 128, 129 to choose the most appropriate conditions of sending of the configuration data DC. These conditions are for example the time of sending the configuration data DC, and/or the network used for this sending.

In an example, the configuration data DC are personalization data and include an installation script of a personalization profile. After the obtaining of the configuration data DC by the secure element 100, the secure element executes the script in order to install the personalization profile in the secure element. According to the "ETSI TS 103.383" standard, a personalization profile is a combination of structures of applications or services files and identification and authentication data. Once installed in the secure element 100, this personalization profile is used by a task application to communicate with entities outside the terminal 120.

In an example, the item of information 128, 129 is the "IMEI" or "IMEISV" number of the terminal 120. The configuration module 162 retrieves (E265) the configuration data DC making it possible to install a profile corresponding to the type of terminal 120, on the basis of the "IMEI" or "IMEISV" number of the terminal 120.

If the terminal 120 is a motor vehicle, the configuration module 162 determines that the personalization profile that must be installed is a personalization profile allowing the sending of data over a high-speed communication channel. This high-speed communication channel is for example of "GPRS" ("General Packet Radio Service"), "UMTS" ("Universal Mobile Telecommunications System") or "HSDPA" ("High Speed Downlink Packet Access") type. Using this personalization profile and the task application, the motor vehicle can suggest an Internet access or a remote breakdown service.

If the terminal 120 is a street lamp or an electricity meter, the configuration module 162 determines, preferably on the basis of the item of information 128, 19, that the personalization profile that must be installed is a personalization profile using a small memory space and allowing only the sending of "SMS" ("Short Message Service") messages by the terminal 120. Using this personalization profile and the task application, the electricity meter can perform remote collection of consumption data by "SMS" message, or the street lamp can be switched on or off by sending "SMS" messages.

In another example, the item of information 128, 129 is the "MCC" code (or equivalent) of the terminal 120. This allows the configuration module 162 to determine a personalization profile adapted to the country where the terminal 120 is. Specifically, a telephone operator uses a different personalization profile for each country, each personalization profile including different authentication algorithms, data filters or applications for each country. Thus, the change of the terminal 120 from one country to another is achieved easily.

In another example, the item of information 128, 129 is the "MNC" code of the terminal 120, which allows the configuration module 162 to recognize the network used by the terminal 120 and to send the configuration data DC via this network. Furthermore, if the item of information 128, 129 is the "NMR" code, the configuration module 162 only sends the configuration data DC when the coverage of the network is of good quality.

Moreover, if the item of information 128, 129 indicates the different types of communication channel supported by the terminal 120 (for example for the "BIP" protocol), the configuration module 162 can choose the most suitable communication channel to send the configuration data DC in the step E275. Thus, the configuration module can take into account the item of information 128, 129 to send the configuration data DC to the secure element 100.

In a particular example, the terminal 120 supports a first communication channel with a considerable speed (e.g. high-speed) and a second communication channel with a moderate speed (e.g. low-speed), the first channel offering a speed greater than the speed of the second channel. In this case, the configuration module 162 (and more generally the configuration system 160) sends the configuration data DC to the application 108 in the step E275 via the first communication channel, i.e. the communication channel offering the highest speed. In a particular case, the configuration module 162 determines from an item of data included in the item of information, 128, 129 that the terminal 120 supports at least two communication channels offering different speeds and consequently selects the communication channel with the highest speed to transmit the configuration data DC to the application 108 in the step E275.

In a particular embodiment, the configuration module 162 determines, on the basis of the item of information 128, 129, the communication channel with the highest speed supported by the secure element 100 (or by the terminal 120), and uses the highest-speed communication channel thus determined to send (E275) the configuration data DC to the application 102 (and more generally to the secure element 100).

In a particular embodiment, when the terminal 120 supports a high-speed communication channel, a first so-called "large size" personalization profile (or file) is transmitted in the step E275 by the configuration system 162 to the application 108. Conversely, when the terminal 120 supports a moderate-speed communication channel, a second personalization profile (or file) of smaller size is transmitted in the step E275 by the configuration system 162 to the application 108. The high-speed communication channel is for example a channel operating according to the https protocol. The moderate-speed communication channel is for example a communication channel operating according to the SMS protocol.

According to a particular implementation, the configuration module 162 is capable of sending (E275), as configuration data DC to the application 102, either a first personalization profile (or more generally a first item of data) of so-called "large size", or a second personalization profile (or more generally a second item of data) of so-called "small size", the size of the first profile being greater than the size of the second profile. For example, the first large-size profile is at least 2, 5, 10 or even 20 times more bulky in terms of data size (i.e. in the number of octets) than the second small-size profile. In a particular example, the first large-size profile has a size of 256 Kbits whereas the second small-size profile has a size of 8 Kbits.

According to a particular example, the configuration module 162 selects which of the first and the second profile must be sent (E275) to the application 102 (or more generally to the secure element 100) depending on the speed of the communication channel supported by the terminal 120 and/or the type of the communication channel supported by the terminal 120, the speed of the channel and/or the type of the channel being preferably determined by the configuration module 162 on the basis of the item of information 128, 129.

In a particular example, the configuration system 162 verifies whether or not a communication channel with a speed at least equal to a predetermined threshold value can be established with the secure element 100 (or more generally with the terminal 120) or else verifies whether or not a communication channel of a predetermined type can be established with the secure element (or more generally with the terminal). This verification step is preferably performed on the basis of the item of information 128, 129. If said verification step is positive, the configuration module 162 sends the first (large-size) profile as configuration data in the sending step (E275) to the secure element 100. In the opposite case, the configuration module 162 sends (E275) the second (small-size) profile as configuration data to the secure element 100.

For example, the large-size first profile is particularly suitable for being transmitted over a communication channel according to the https protocol. In addition, the small-size second profile is for example particularly suitable for being transmitted by a communication channel according to the SMS protocol.

As previously indicated, the configuration module 162 can take into account the item of information 128, 129 to send the configuration data DC to the secure element 100 and, more particularly, to the application 108. In a particular example, the item of information 128, 129 provides information about the type of the terminal 120 (for example whether it is a mobile phone or an electricity meter). The configuration module 120 is thus able, on the basis of the item of information 128, 129 to determine at least one of the parameters below:

(a) the configuration data DC to be sent (E275) to the application 108 (for example by choosing either a first so-called "large-size" personalization profile or a second personalization profile of smaller size);

(b) the communication channel (or the channel type), the communication protocol and/or the carrier to be used to send (E275) the configuration data DC to the application 108 (so as to choose, for example, the most suitable channel and/or protocol for the capabilities of the terminal 120).

In a particular example, the configuration module 120 determines on the basis of the item of information 128, 129 whether the terminal 120 is a mobile phone (or more generally a mobile telecommunications terminal) or an electricity meter. The configuration module 120 then adapts at least one of the parameters (a) and (b) mentioned above when sending (E275) configuration data DC to the application 108.

The adaptation of the parameters (a) and/or (b) above makes it possible to optimize the sending (E275) of the configuration data DC depending on the capabilities of the terminal 120 executing the application 108. Thus, an electricity meter is an appliance with the primary function of measuring the electrical quantity consumed in one place (a residence, an industrial site etc.). Electricity meters so-called smart are for example capable of performing remote collection of consumption data by "SMS" message and of also receiving the configuration data DC via the SMS protocol. On the other hand, such electricity meters are not for example capable of receiving the configuration data DC, via the https protocol, unlike mobile phones which have capability of communicating over the Internet network.

The configuration profile PC can also be used to allow the terminal 120 to communicate with an e-mail server, in order to synchronize with a local messaging system.

Those skilled in the art will understand that the embodiments and variants described above are only non-limiting exemplary implementations of the invention. In particular, those skilled in the art may consider any combination whatsoever of the variants and embodiments described above in order to meet a specific need.

The invention claimed is:

1. A notification method for configuring a secure element incorporated into a terminal connected to a network, said method comprising the following steps implemented by an application of said secure element:
    obtaining an item of information that can be used to configure the secure element stored in a memory of the terminal outside the secure element,
    sending said item of information and an identifier of the secure element to a configuration system, and
    obtaining configuration data specific to the terminal based on at least one of the item of information and the identifier, the configuration data originating from the configuration system,
    wherein said configuration data are personalization data and include an installation script of a personalization profile,
    and wherein the item of information includes type information corresponding to a type of the terminal, the type information enabling determination of:
    the personalization profile from among a first personalization profile and a second personalization profile, the second personalization profile being of smaller size than the first personalization profile, and
    a communication channel, the communication channel being defined by at least one of a communication protocol and a carrier by which the configuration data is to be sent.

2. The notification method according to claim 1, wherein said steps of obtaining said item of information and sending said item of information and an identifier of the secure element are implemented when the secure element is powered up and/or periodically.

3. The notification method according to claim 1, wherein the sending of said item of information and the identifier of the secure element is done using the Sim Tool Kit command "SEND SMS" or "OPEN CHANNEL", defined by the "3GPP 31.111" standard.

4. The notification method according to claim 1, wherein said item of information is obtained from a communication interface of the terminal with the network, or from an application executed by a processor of the terminal, the application being outside the secure element.

5. The notification method according to claim 1, wherein the obtaining of said item of information is done at the request of the application of the secure element.

6. The notification method according to claim 5, wherein the request is in accordance with the Sim Tool Kit command "PROVIDE LOCAL INFORMATION" defined by the "3GPP 31.111" standard.

7. A secure element intended to be incorporated into a terminal connected to a network, said secure element performing operations including:
    obtaining, according to instructions executed by a processor of the secure element, an item of information that can be used for the configuration of the secure element stored in a memory of the terminal outside the secure element,
    sending, according to the instructions, said item of information and an identifier of the secure element to a configuration system, and
    obtaining, according to the instructions, configuration data specific to the terminal based on at least one of the item of information and the identifier, the configuration data originating from the configuration system,
    wherein said configuration data are personalization data and include an installation script of a personalization profile, and
    wherein the item of information includes type information corresponding to a type of the terminal, the type information enabling determination of:
    the personalization profile from among a first personalization profile and a second personalization profile, the second personalization profile being of smaller size than the first personalization profile, and
    a communication channel, the communication channel being defined by at least one of a communication protocol and a carrier by which the configuration data is to be sent.

8. The secure element according to claim 7, wherein the secure element is compliant with the "ISO 7816" standard and capable of processing commands of "APDU" type.

9. The secure element according to claim 7, wherein the secure element is of "UICC" type or of "eUICC" type.

10. A terminal comprising:
    a secure element, the secure element comprising a processor; and
    a communication interface configured to communicate with a communications network, wherein the secure element is configured to perform operations comprising:
    obtaining, according to instructions executed by the processor of the secure element, an item of information that can be used for the configuration of the secure element stored in a memory of the terminal outside the secure element, sending, according to the instructions, said item of information and an identifier of the secure element to a configuration system, and obtaining, according to the instructions, configuration data specific to the terminal based on the item of information and the identifier, the configuration data originating from the configuration system, wherein said configuration data are personalization data and include an installation script of a personalization profile, and wherein
    the configuration data is provided to the secure element via a communication channel determined based on the item of information, the communication channel being defined by at least one of a protocol and a carrier.

11. The terminal according to claim 10, wherein the terminal includes a communication interface with the network, the communication interface including a radio module for sending said item of information to the application of the secure element.

12. A non-transitory storage medium readable by a secure element incorporated into a terminal connected to a network, on which is stored a computer program comprising instructions for the execution of a notification method for configuring the secure element, the method implemented by an application of the secure element, comprising:
    obtaining an item of information that can be used to configure the secure element stored in a memory of the terminal outside the secure element, sending said item of information and an identifier of the secure element to a configuration system, and obtaining configuration data specific to the terminal based on at least one of the item of information and the identifier, the configuration data originating from the configuration system, wherein said configuration data are personalization data and include an installation script of a personalization profile, wherein the configuration data is provided to the secure element via
    a communication channel determined based on the item of information, the communication channel being defined by at least one of a protocol and a carrier.

13. A method of configuration of a secure element incorporated into a terminal connected to a network, said method being implemented by a configuration system, said method comprising:

obtaining and memorizing at least one item of information that can be used to configure the secure element and an identifier of the secure element originating from the secure element, establishing a secure communication channel with the secure element, and sending configuration data specific to the terminal, based on at least one of the item of information and the identifier, to the secure element via said communication channel, wherein said configuration data are personalization data and include an installation script of a personalization profile, and wherein the item of information includes type information corresponding to a type of the terminal, the type information enabling determination of:

the personalization profile from among a first personalization profile and a second personalization profile, the second personalization profile being of smaller size than the first personalization profile, and the communication channel, the communication channel being defined by at least one of a communication protocol and a carrier by which the configuration data is to be sent.

14. The method according to claim 1, wherein obtaining the configuration data is carried out according to a protocol including a step of encryption and/or signature.

15. The method according to claim 1, wherein the identifier of the secure element is one of a group consisting of:

an "eUICC ID" defined by version 1.46 of the specification "Remote Provisioning Architecture for Embedded UICC" of the "Global System for Mobile Communications Association", an "ICC ID" defined by the "ISO 7812" standard, and an "IMSI".

16. The method according to claim 1, wherein the item of information is used to determine at least one element out of a group consisting of:

the personalization profile, wherein the personalization profile is adapted to a terminal type of the terminal, and the personalization profile, wherein the personalization profile is adapted to a country where the terminal is located.

17. The method according to claim 13, wherein the method further comprises:

determining on the basis of said at least one item of information, a communication channel with the highest speed supported by the secure element or by the terminal, said communication channel with the highest speed being used as the secure communication channel in the step of sending the configuration data to the secure element.

18. The method according to claim 13, further comprising:

verifying to verify whether or not a communication channel with a speed at least equal to a predetermined threshold value can be established with the secure element or verifying whether or not a communication channel of a predetermined type can be established with the secure element, and:

if so, sending of first data as configuration data in the step of sending to the secure element;

if not, sending of second data as configuration data in the step of sending to the secure element, the first data having a larger data size than the second data.

19. The method according to claim 18, wherein the first data have a data size N times larger than the second data, N being equal to one of the values 2, 5, 10, and 20.

20. A system of configuration of a secure element incorporated into a terminal connected to a network, said system comprising:

a management module configured to obtain at least one item of information that can be used to configure the secure element and an identifier of the secure element originating from the secure element, a secure communication module for secure communication with the secure element, said secure communication module configured to establish a secure communication channel with the secure element, a first memory configured to memorize said at least one item of information and the identifier of the secure element, and a configuration module configured to send configuration data specific to the terminal based on at least one of the item of information and the identifier, to the secure element via said communication channel, said configuration data being provided to the secure element depending on the at least one item of information, wherein said configuration data are personalization data and include an installation script of a personalization profile, and wherein the item of information includes type information corresponding to a type of the terminal, the type information enabling determination of:

the personalization profile from among a first personalization profile and a second personalization profile, the second personalization profile being of smaller size than the first personalization profile, and the communication channel, the communication channel being defined by at least one of a communication protocol and a carrier by which the configuration data is to be sent the configuration data.

21. The system according to claim 20, wherein the configuration module is further configured to:

send the identifier of the secure element to the first memory, and retrieve said at least one item of information, in response to sending the identifier of the secure element.

22. A non-transitory storage medium readable by a configuration system, on which is stored a computer program comprising instructions for the execution of a method of configuration of a secure element incorporated into a terminal connected to a network, the method being implemented by the configuration system, the method comprising:

obtaining and memorizing at least one item of information that can be used to configure the secure element and an identifier of the secure element originating from the secure element, establishing a secure communication channel with the secure element, and sending configuration data specific to the terminal based on at least one of the item of information and the identifier, to the secure element via said communication channel, wherein said configuration data are personalization data and include an installation script of a personalization profile, and wherein the item of information includes type information corresponding to a type of the terminal, the type information enabling determination of:

the personalization profile from among a first personalization profile and a second personalization profile, the second personalization profile being of smaller size than the first personalization profile, and the communication channel, the communication channel being defined by at least one of a communication protocol and a carrier by which the configuration data is to be sent.

23. A system comprising:

a configuration system comprising:

a management module configured to obtain at least one item of information that is used to configure a-secure element and an identifier of the secure element originating from the secure element, a secure communication module configured to secure communication with the secure element, the secure communication module configured to establish a secure communication channel with the secure element, a first memory configured to store the at least one item of information and the identifier of the secure element, and a configuration module configured to send configuration data to the secure element via the communication channel;

a terminal comprising:

a second memory;

the secure element, the secure element comprising a processor that is configured to obtain the at least one item of information that is stored in the second memory, provide the at least one item of information and the identifier of the secure element to the configuration system, and obtain configuration data specific to the terminal based on at least one of the item of information and the identifier, the configuration information originating from the configuration system; and a communication interface configured to communicate using the secure communications channel, wherein the configuration data are personalization data and include an installation script of a personalization profile, and wherein the item of information includes type information corresponding to a type of the terminal, the type information enabling determination of:

the personalization profile from among a first personalization profile and a second personalization profile, the second personalization profile being of smaller size than the first personalization profile, and the communication channel, the communication channel being defined by at least one of a communication protocol and a carrier by which the configuration data is to be sent.

24. The notification method of claim 1, wherein, when the type information indicates that the terminal is a mobile phone, an https protocol is determined for the communication channel; and wherein when the type information indicates that the terminal is an electric meter, a SMS protocol is determined for the communication channel.

25. The secure element of claim 7, wherein, when the type information indicates that the terminal is a mobile phone, an https protocol is determined for the communication channel; and wherein when the type information indicates that the terminal is an electric meter, a SMS protocol is determined for the communication channel.

26. The method of claim 13, wherein, when the type information indicates that the terminal is a mobile phone, an https protocol is determined for the communication channel; and wherein when the type information indicates that the terminal is an electric meter, a SMS protocol is determined for the communication channel.

* * * * *